Feb. 27, 1934.    G. C. HOWARD    1,948,858
LIGNIN DERIVATIVES AND PROCESS OF MAKING SAME
Original Filed June 10, 1930
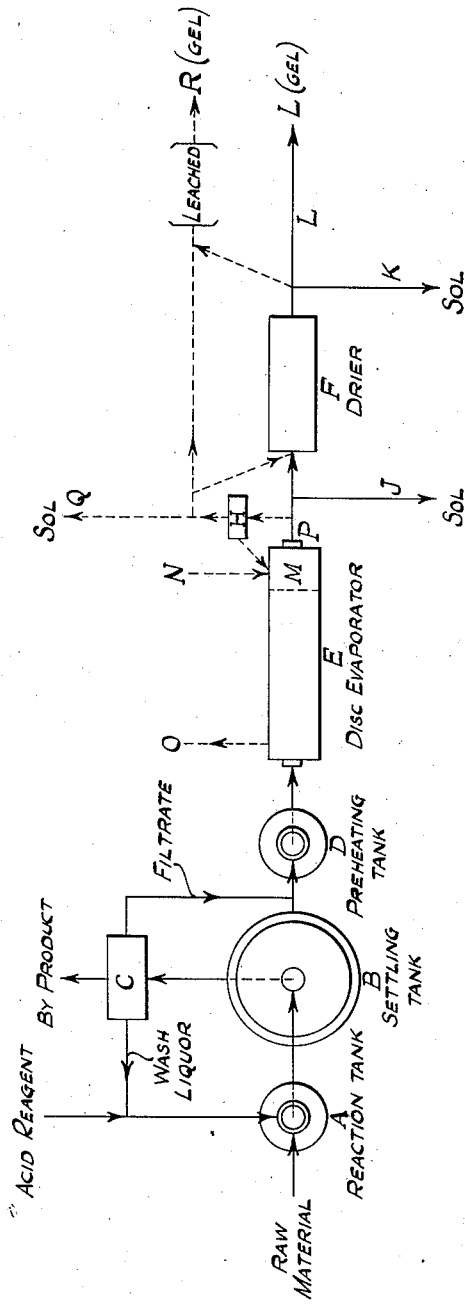
INVENTOR
GUY C. HOWARD.
BY
Dyke and Schaines
ATTORNEYS.

Patented Feb. 27, 1934

1,948,858

UNITED STATES PATENT OFFICE 1,948,858

LIGNIN DERIVATIVES AND PROCESS OF MAKING SAME

Guy C. Howard, Wausau, Wis.

Continuation of application Serial No. 460,150, June 10, 1930. This application April 11, 1933. Serial No. 665,486

17 Claims. (Cl. 260—158)

The present application is filed as a continuation of my application Serial No. 460,150, filed June 10, 1930, with the same title.

This invention relates to the production of lignin derivatives in both gel and sol forms which are novel and useful for various purposes, for example as bonding and adhesive agents, as filler and sizing materials, and as raw material for conversion into derivatives thereof.

The raw material from which these products are prepared is preferably the waste sulphite liquor resulting from the making of paper pulp by the acid sulphite pulping process. The waste liquors from some analogous pulping processes, for example the magnesium or ammonium monosulphite pulping processes, can be used but the waste liquors from the sodium monosulphite pulping process are not well suited for our purpose because they do not as readily lend themselves to a separation of the non-ligneous and lignin constituents of the waste liquor. In principle it is necessary to have the lignin substance in the form of a lignin-suphonic acid compound and to be able to separate such lignin substance from associated non-ligneous organic matter.

For the manufacture of these improved products I preferably use the lignin-containing material obtained from waste sulphite liquor by precipitation with caustic lime at atmospheric pressure and at a temperature not over 100° C. and decantation or filtration in accordance with the process described and claimed in my U. S. patents, Reissue No. 18,268 dated December 1, 1931, and No. 1,856,558 dated May 3, 1932. This raw material as thus derived from waste sulphite liquor by treatment thereof with an alkaline earth hydroxide, e. g., caustic lime, is a solid lignin-containing product substantially freed from the non-ligneous organic constituents in the waste sulphite liquors. Such lignin-containing material is alkaline and has a pH value above 10.5. It is in the form of a basic calcium salt of lignin-sulphonic acid and contains minor amounts of associated inorganic compounds such as calcium monosulphite and calcium sulphate.

Such preferred solid lignin-containing raw material can be readily rendered soluble in aqueous solutions by various procedures and in principle this solubilizing is accomplished either (1) by lowering the pH value through addition of an acid having a strength equal to or greater than carbonic acid which is effective by reaction on the line components and yields a solution of acid pH value, or (2) by addition of salts of weak bases with strong acids which can yield insoluble salts with lime such, for example, as $Al_2(SO_4)_3$, $MgSO_4$, etc., and which are effective through replacement of combined lime and yield solutions which may be either acid or alkaline depending on the salt used, e. g., $Al_2(SO_4)_3$ can yield a solution of acid pH value while $MgSO_4$ will yield an alkaline solution, or (3) by the addition of alkali metal compounds, for example $Na_2SO_3$, $Na_2CO_3$, $Na_2SO_4$, NaOH, etc., which render it soluble through conversion from an alkali earth metal to an alkali metal system and which yield solutions of alkaline pH value.

Such solutions will all contain organically combined sulphur in the form of a lignin-sulphonic acid compound and will contain lime or other bases in the form of salts. The amount of base present will vary with the methods used to effect solution, or in other words, with the pH value of the solution and depending on the pH value the base will be present as a salt of the sulphonic acid group or in part also as the salt of weaker acidic groups present in the lignin substance. Some base will also be present as various inorganic salts, for example sulphites and sulphates.

The preferred process will be described in detail later but the essential steps are outlined at this point to facilitate disclosure of the principles involved: (1) Dissolving the preferred raw material containing lignin substance, (2) separating out an insoluble inorganic by-product when necessary by reason of the method used to effect solution, (3) adding a suitable acid to the solution to lower its pH value to a desired point, (4) removing an insoluble inorganic by-product when desired, (5) subjecting the solution to suitable treatment to induce the escape of sulphur as sulphur dioxide, (6) evaporating the solution when desired to a more concentrated liquid phase form or to a solid phase form, (7) utilizing the products as such or treating further as may be desired.

When such preferred raw material is dissolved by treatment with a suitable acid, e. g., $H_2SO_4$, the resultant solution will contain a calcium salt of lignin-sulphonic acid and some calcium bisulphite as derived from the calcium monosulphite constituent normally present in such raw material. If additional acid, e. g., $H_2SO_4$, is added to the solution in equimolecular amount to the calcium salts present (exclusive of any lime already present as $CaSO_4$) the resultant solution will contain free lignin-sulphonic acid and free sulphurous acid mixed with insoluble $CaSO_4$ crystals. If insufficient acid is added the solution will contain a mixture of the free lignin-sulphonic acid and the lime salt of such acid, or if too much acid is added it will contain the free lignin-sulphonic acid and free sulphuric acid. If some other acid is used, e. g., HCl, the result will be similar save that the resulting inorganic salt will remain in solution as its soluble chloride salt.

When a solution containing free lignin-sulphonic acid substantially free from its salts is evaporated to dryness in an open vessel and the residue leached with water it yields a lignin product in gel form which is practically insoluble but disperses very slowly to the sol form. (The terms gel and sol as used herein are to distinguish between a solid gelatinous form of a colloidal system and a liquid or dispersed form.) In the evaporation of such free lignin-sulphonic acid there will form a relatively tough skin film on the surface of the solution. On removing this film substance and leaching with water it also yields a gel product which, however, is softer and disperses more readily to the sol form than the gel product resulting from the above evaporated residue.

If the free lignin-sulphonic acid solution contains salts of lignin-sulphonic acid, e. g., the sodium salt, the residue from evaporation of such solution to dryness will readily disperse in water to a sol form and does not yield the gel product.

If on the other hand the solution of free lignin-sulphonic acid contains strong mineral acid, e. g., $H_2SO_4$, in excess of a permissible small amount the residue from evaporation will not yield a similar gel product but gives an insoluble residue of different properties on leaching with water.

On adding a salting-out agent, such for example, as NaCl, to the solution of free lignin-sulphonic acid, a lignin-containing substance comes out as a flocculated precipitate in the cold and on heating this agglomerates into masses and tends to soften and become more or less plastic. On removing such solid material from its mother liquor and leaching the wet cake with water, it yields a gel product provided salts of lignin-sulphonic acid were absent in the free lignin-sulphonic acid solution, and the solution is heated for sufficiently long time during the salting-out operation. If the wet, salted-out cake is oven-dried at not over 105° C. before leaching, it yields a still firmer and more stable gel product. If the wet cake material is given a steam pressure cook in its salting-out mother liquor it agglomerates to a mass which on leaching with water yields a relatively firm, spongy-like mass, which tends to float indefinitely in water—even after it is water saturated.

From these observations, it is believed that the free lignin-sulphonic acid undergoes a chemical and physical alteration to yield the gel product when its solution is heated and evaporated under conditions of sufficiently low pH value but without having a detrimental excess of strong mineral acid present and that the removal of sulphurous acid and bisulphite salts from the system as completely as practicable facilitates such alteration and the yield of the gel product, or in other words that some specific (or particular) alteration in the free lignin-sulphonic acid takes place under these conditions.

Both a preferred and an alternative procedure for making these lignin derivatives in gel and sol forms from the above-mentioned preferred raw material will now be described with reference to the attached drawing and which will serve to illustrate the scope of this invention.

Step 1

A is a dissolving tank of suitable design into which the preferred raw material is fed and to which an acid reagent is added both for the purpose of effecting solution and to lower the pH value of the resulting solution to the desired point. Such reagent must be an acid of sufficient strength to decompose salts of lignin-sulphonic acid and inorganic sulphites. Sulphuric acid ($H_2SO_4$), of suitable dilution is used, and by this preferred procedure $CaSO_4$ is the inorganic by-product yielded by dissolving and acidifying the raw material. The amount of acid added will depend on whether a solution of free-lignin-sulphonic acid or a solution containing a mixture of free-lignin-sulphonic acid and its salts is desired and will be calculated from the amount of base present in the original raw material exclusive of any calcium sulphate already contained therein. In general, if the amount of acid so added is sufficient to yield a solution having a pH value around 1.00, it will approximate a condition in which organic salts are effectively absent and free mineral acids are not present in detrimental amounts. If a solution containing both free lignin-sulphonic acid and its calcium salt is desired, the pH value of the solution will range between 1.0 and around 4.0, and at still higher pH values the solution will not contain material amounts of the free lignin-sulphonic acid. Particularly when the gel product is being made, a small excess over the calculated amount of the $H_2SO_4$ acid is added to assure the absence of salts of lignin-sulphonic acid and maintain a favorable low pH value but a large excess of acid is avoided as being detrimental.

The resulting solution in tank A is kept as concentrated as practicable and still allow separating the precipitated $CaSO_4$ by sedimentation or filtration in subsequent Step 2.

This procedure of dissolving and acidifying may if desired be carried out in two or more operations.

Step 2

The acidified charge from A is transferred to tank B in which the precipitated $CaSO_4$ is sedimented out and removed by filtration in filter C as an inorganic by-product to be discharged or utilized in processes not shown. The dilute liquors resulting from the washing of this $CaSO_4$ are returned as process liquors to tank A.

Step 3

The clear decant solution from tank B together with the undiluted filtrate resulting from the removal of $CaSO_4$ on filter C is run to tank D of suitable design. The main function of this tank is for process storage and to preheat the solution further when desired, preferably by indirect steam or other heat, preparatory to the subsequent treatment in Step 4.

Step 4

The hot solution from tank D is fed to evaporator equipment E which is preferably a disc type evaporator or equivalent, characterized by the gas phase in contact with the liquor being a mixture of air or other gases and water vapor rather than essentially steam alone. Such disc type evaporator is preferred because of the acid character of the liquor and as being a favorable and economical means of substantially completely removing sulphurous acid ($SO_2$) from the solution with simultaneous concentration by evaporation. Such removal of sulphurous acid is induced by heating and evaporating the liquor under conditions of sufficiently low partial pressure of sulphur dioxide in the gas phase contacting with the liquor to allow the substantially complete escape from the liquor of sulphur dioxide gas.

When the gel product is being made it is necessary to evaporate the solution nearly to dryness. If the solution containing free lignin-sulphonic acid and free from salts of lignin-sulphonic acid, is evaporated only to a thick viscous consistency it still readily disperses in water to a sol product without yielding any of the gel product. If evaporated progressively further the gel product begins to appear in increasing amount and stability on dilution with water and prior to reaching a bone dry basis the gel product in good yield and quality results on dilution of such residue with water. It is at this drying stage that the necessity of avoiding an excess of free mineral acid and overheating is critical due to detrimental reactions resulting from such concentrated acid.

In making the gel product the solution is therefore evaporated in equipment E under conditions favoring the escape of SO₂ until the charge is highly concentrated but still fluid enough to be discharged.

When sol form products are being made the fluid discharge from E normally constitutes the final sol product from this preferred process and is withdrawn at J, but if desired it may be concentrated further under proper precautions and withdrawn at K. Such sol product is characterized in that it does not yield the gel product on dilution with water.

*Step 5*

The concentrated discharge from evaporator E is transferred to equipment F which is a drier of more suitable design to continue the evaporation of the material to a solid or semi-solid condition and to a dryness that will yield the desired gel product on dilution or leaching with water of suitable (acid) pH value. The facility with which such gel product tends to change to its sol form depends on the pH value of the dilution liquor. Strong mineral acids and other specific compounds in the dilution or leaching water act to stabilize the gel whereas alkalies and probably other specific substances function to disperse it to the sol form.

The final gel product from this preferred procedure is withdrawn at L in the form of substantially dry solid material which is practically insoluble in water of acid pH value but changes on adding water to a more or less solid gelatinous form.

In case waste sulphite liquor is used as a raw material in the manner just described without being treated to effect a substantial separation of its carbohydrates from the lignin substance, the material exiting from L will be an essentially different product provided it is given a prolonged baking treatment in equipment F subsequent to its reaching dryness and even though this baking treatment has not exceeded a temperature of 105° C. Such product comes out as a lava-like black material with noticeable lustre and showing evidence of the evolution of gaseous products during such baking treatment. It is practically insoluble in water and the usual organic solvents, but softens somewhat in water. Such product will result with or without there being free mineral acid present and in the presence of some organically combined base, but evidently does not occur when mineral and strong organic acids are absent, as for example at pH=7.0. The water insoluble material present in such product exceeds the lignin content of the original waste sulphite liquor and roughly amounts to 75% or more of the total organic matter in the waste sulphite liquor. On dialyzing out the carbohydrates from waste sulphite liquor and treating the residual dialyzed solution in the above manner the resulting product has appreciably less of this lava-like character. It appears, therefore, that the lava-like product is a chemical condensation product of the lignin with carbohydrates, or carbohydrate derivatives, or both and that the presence of acid facilitates its formation. The making of such products from waste sulphite liquor without a preliminary separation of lignin substance from associated carbohydrate substance is not claimed as a part of this invention.

An alternative procedure involving a salting-out operation will now be described in detail by reference to the drawing in which the dotted lines relate to features which are not common to the above described preferred process.

*Step (a).*—This involves the same procedure as in Step 1 of the preferred process.

*Step (b).*—Same as Step 2 above.

*Step (c).*—Same as Step 3 above.

*Step (d).*—The hot solution from tank D is treated with a salting-out agent in equipment E which is a disc evaporator the same as used in the process already described except that a settling compartment, as indicated by M beyond the dotted line, is built integral with the evaporator. Sodium chloride (NaCl) is usually preferred as the salting-out agent and this is contained in E in the form of a hot mother liquor remaining from previous salting-out operations. Provisions are made as at N and O to add fresh NaCl or to withdraw mother liquor for removal of accumulating impurities or to adjust its gallonage. This salting-out liquor is essentially a concentrated solution of NaCl, but it need not carry an NaCl content equal to the saturation solubility of that salt in water, although it may approach or reach the saturation point of NaCl in the system being salted out. The charge in E is maintained at a temperature approaching its boiling point and is preferably stirred or otherwise mixed.

On passing the hot solution from D into E a flocculated precipitate is thrown out which tends to agglomerate into granular or larger masses that are plastic when hot.

The charge in E is subjected to suitable heat and evaporation under conditions favorable for the substantially complete escape of SO₂ from the solution as heretofore described in connection with Step 4 of the preferred procedure. The time and other conditions of treatment will depend somewhat on the kind of product being made. When the gel product is wanted it is preferable to give the charge in E a sufficiently long treatment to give a salted-out material which can be leached wet (i. e. without preliminary drying) to yield the desired gel product. A salted-out material which yields a too readily dispersing gel product on leaching will give a more stable gel product if the wet cake is dried at not over 105° C. prior to leaching. It is therefore optional to some extent whether the treatment in E be prolonged to give a salted-out material which is leached wet to yield the gel product or this treatment in E reduced to a limit and the salted-out material dried prior to leaching. On the other hand when the sol product is wanted the treatment in E cannot be prolonged provided organic salts are absent from the system.

The salted-out solids are removed as bottoms from the settling compartment M of E and are filtered or centrifuged in equipment H or otherwise treated to reduce their mother liquor content to a minimum and the mother liquor thus removed is returned to E.

*Step (e).*—When the sol product is being made the wet solid material removed by H is the desired lignin derivative in potential sol form and is withdrawn at Q or it may be dried in case organic salts are present and still yield the sol product on dispersing in water.

When the gel product is being made the wet solids from H may be leached with water of suitable acid pH value to yield the desired lignin derivative in gel form and be removed at R, or such wet solids from H may be dried in F and then leached and removed at R as the lignin derivative in gel form. (It is in the drying of such solids that the necessity of avoiding an excess of free mineral acid and of overheating is critical due to detrimental reactions.) The essentials of such leaching operations are to dissolve out the residual soluble salting-out agent without dispersion of the lignin derivative from its gel to sol form. For reasons stated above the leach liquors are normally fresh water to which acid or an acid salt is added in sufficient amount to establish and maintain a favorable acid pH value.

The leaching may be carried out in a series of tanks on the counter current washing principle and the resulting leach liquor normally run to waste or it may be treated to recover its NaCl content or its organic matter content.

The leached product in its gel form may be used wet or it can be dried under proper conditions to yield a dry product which changes again in water to the gel form, or either before or after drying it may be given further chemical or physical treatments to yield derived products thereof. Such lignin gel products are in jelly-like form when wet and are practically free from non-ligneous organic matter and from inorganic compounds.

For certain uses it is necessary or preferable to employ other salting-out agents than NaCl, such for example as $Na_2SO_4$, $NaHSO_4$, $(NH_4)_2SO_4$, $CaCl_2$, etc.

In drying the salted-out solids to produce sol or gel products it is necessary to avoid overheating. On the other hand a desirable but materially different product, which is fully described and claimed in my application Serial No. 490,557 filed October 22, 1930, may be made if such salted-out material, which under normal drying at 105° C. or below yields the gel product, is heated or baked for some time at a temperature over 105° C. Such product is more insoluble in water than the gel product previously described and does not change in water to the solid gelatinous form. This product is insoluble in acids and relatively insoluble in alkalies and is further characterized by grinding easily to a jet black powder of unusual fineness, stability and other desirable properties.

I claim:

1. The process of making lignin derivatives of the character described, which consists in separating lignin substance from associated non-ligneous organic matter to obtain an aqueous dispersion of free lignin-sulphonic acid substantially free from non-ligneous organic matter and from salts of lignin-sulphonic acid, heating and evaporating such aqueous dispersion under conditions of sufficiently low partial pressure of sulphur dioxide in the gas phase contacting with the dispersion to induce the substantially complete escape from the dispersion of sulphur dioxide gas, diluting the resulting evaporated product with water to produce a lignin derivative in gel form, and separating the gel product from the mother liquor.

2. The process of making lignin derivatives of the character described, which consists in separating lignin substance from associated non-ligneous organic matter to obtain an aqueous dispersion of free lignin-sulphonic acid substantially free from non-ligneous organic matter and containing some organically combined base in the form of a salt of lignin-sulphonic acid, heating and evaporating such aqueous dispersion under conditions of sufficiently low partial pressure of sulphur dioxide in the gas phase contacting with the dispersion to induce the substantially complete escape from the dispersion of sulphur dioxide gas, diluting the resulting evaporated product with water to produce a lignin derivative in aqueous dispersion of its sol form.

3. The process of making lignin derivatives of the character described which comprises heating and evaporating an aqueous dispersion of free lignin-sulphonic acid substantially free from non-ligneous organic matter and from salts of lignin-sulphonic acid under conditions of sufficiently low partial pressure of sulphur dioxide in the gas phase contacting with the dispersion to induce the substantially complete escape from the dispersion of sulphur dioxide gas, thereby obtaining an evaporated product which on dilution with water yields a lignin derivative in gel form.

4. The process of making lignin derivatives of the character described which comprises heating and evaporating an aqueous dispersion of free lignin-sulphonic acid substantially free from non-ligneous organic matter and containing some organically combined base in the form of a salt of lignin-sulphonic acid under conditions of sufficiently low partial pressure of sulphur dioxide in the gas phase contacting with the dispersion to induce the substantially complete escape from the dispersion of sulphur dioxide gas, thereby obtaining an evaporated product which on dilution with water gives an aqueous dispersion of a lignin derivative in sol form.

5. The process of making lignin derivatives of the character described which consists in separating lignin substance from associated non-ligneous organic matter to obtain an aqueous dispersion of free lignin-sulphonic acid substantially free from non-ligneous organic matter and from salts of ligno-sulphonic acid, adding a salting-out agent to the dispersion whereby lignin substance is precipitated, heating and evaporating the resulting mixture of solids and liquid under conditions of sufficiently low partial pressure of sulphur dioxide in the gas phase contacting with the mixture to induce the substantially complete escape from the mixture of sulphur dioxide gas, separating solids from liquid, and leaching the solids with water to remove the associated salting-out compound and to yield a lignin derivative in gel form.

6. The process of claim 5 in which the solids separated from the liquid after the heating and evaporating treatment are dried prior to leaching with water.

7. The process of making lignin derivatives of the character described which consists in separating lignin substance from associated non-ligneous organic matter to obtain an aqueous dispersion of free lignin-sulphonic acid substantially free from non-ligneous organic matter and containing some organically combined base in the form of a salt of lignin-sulphonic acid, adding a salting-out agent to the dispersion whereby lignin substance is precipitated, heating and evaporating the resulting mixture of solids and liquid under conditions of sufficiently low partial pressure of sulphur dioxide in the gas phase contacting with the mixture to induce the substantially complete escape from the mixture of sulphur dioxide gas, separating solids from liquid, and mixing the solids with water to yield an aqueous dispersion of lignin derivative in sol form.

8. The process of making lignin derivatives of the character described which comprises adding a salting-out agent to an aqueous dispersion of free lignin-sulphonic acid substantially free from non-ligneous organic matter and from salts of ligno-sulphonic acid whereby lignin substance is precipitated, heating and evaporating the resulting mixture of solids and liquid under conditions of sufficiently low partial pressure of sulphur dioxide in the gas phase contacting with said mixture to induce the substantially complete escape from the mixture of sulphur dioxide gas and separating solids from liquid, thereby obtaining a solid material which on leaching with water yields a lignin derivative in gel form.

9. The process of making lignin derivatives of the character described which comprises adding a salting-out agent to an aqueous dispersion of free lignin-sulphonic acid substantially free from non-ligneous organic matter and containing some organically combined base in the form of a salt of lignin-sulphonic acid whereby lignin substance is precipitated, heating and evaporating the resulting mixture of solids and liquid under conditions of sufficiently low partial pressure of sulphur dioxide in the gas phase contacting with said mixture to induce the substantially complete escape from the mixture of sulphur dioxide gas and separating solids from liquid, thereby obtaining a solid material which contains a lignin derivative which upon addition of water yields an aqueous dispersion of such derivative in sol form.

10. A lignin derivative in gel form produced by heating and evaporating an aqueous dispersion of free lignin-sulphonic acid substantially free from non-ligneous organic matter and from salts of ligno-sulphonic acid under conditions of sufficiently low partial pressure of sulphur dioxide in the gas phase contacting with the dispersion to induce the substantially complete escape from the dispersion of sulphur dioxide gas, adding water to the resulting evaporated product to convert the same into gel form and separating it from the mother liquor.

11. A lignin deivative in aqueous dispersion of its sol form produced by heating and evaporating an aqueous dispersion of free lignin-sulphonic acid and a salt of such acid substantially free from non-ligneous organic matter under conditions of sufficiently low partial pressure of sulphur dioxide in the gas phase contacting with the dispersion to induce the substantially complete escape from the dispersion of sulphur dioxide gas and adding water to the resulting evaporated product to yield an aqueous dispersion of a lignin derivative in sol form.

12. A lignin derivative in gel form produced by adding a salting-out agent to an aqueous dispersion of free lignin-sulphonic acid substantially free from non-ligneous matter and from salts of ligno-sulphonic acid whereby lignin substance is precipitated, heating and evaporating the resulting mixture of solids and liquid under conditions of sufficiently low partial pressure of sulphur dioxide in the gas phase contacting with said mixture to induce the substantially complete escape from the mixture of sulphur dioxide gas, separating solids from liquid, leaching the separated solids with water to remove the associated salting-out compound and to convert the lignin product into gel form, and separating it from the mother liquor.

13. A lignin derivative in aqueous dispersion of its sol form produced by adding a salting-out agent to an aqueous dispersion of free lignin-sulphonic acid and a salt of such acid substantially free from non-ligneous organic matter whereby lignin substance is precipitated, heating and evaporating the resulting mixture of solids and liquid under conditions of sufficiently low partial pressure of sulphur dioxide in the gas phase contacting with said mixture to induce the substantially complete escape from the mixture of sulphur dioxide gas, separating solids from liquid and adding water to the separated solids to yield an aqueous dispersion of a lignin derivative in sol form.

14. The process of making lignin derivatives of the character described which comprises exposing a heated aqueous dispersion containing free lignin-sulphonic acid and substantially free from non-ligneous organic matter to an atmosphere favorable to a substantially complete escape of sulphur dioxide gas from such dispersion.

15. A composition of matter in gel form practically free from non-ligneous organic matter, and from inorganic compounds, produced by exposing a heated aqueous dispersion containing free lignin-sulphonic acid to an atmosphere favorable to a substantially complete escape of sulphur dioxide gas from said dispersion.

16. A lignin derivative produced by heating and evaporating an aqueous dispersion containing free lignin-sulphonic acid substantially free from non-ligneous organic matter under conditions of sufficiently low partial pressure of sulphur dioxide in the gas phase contacting with the dispersion to induce the substantially complete escape of sulphur dioxide gas from the aqueous dispersion, and adding water to the resulting evaporated product.

17. A lignin derivative produce by adding a salting out agent to an aqueous dispersion containing free lignin-sulphonic acid substantially free from non-ligneous matter, whereby lignin substance is precipitated, heating and evaporating the resulting mixture of solids and liquid under conditions of sufficiently low partial pressure of sulphur dioxide in the gas phase contacting with said mixture to induce the substantially complete escape of sulphur dioxide gas from the liquid and separating the solids from liquid.

GUY C. HOWARD.